United States Patent [19]

Zainaleain

[11] Patent Number: 5,191,276

[45] Date of Patent: Mar. 2, 1993

[54] VERSATILE BATTERY/CHARGER MODULE AND SYSTEM

[75] Inventor: Mortaza Zainaleain, Cordova, Tenn.

[73] Assignee: Federal Express Corporation, Memphis, Tenn.

[21] Appl. No.: 727,980

[22] Filed: Jul. 10, 1991

[51] Int. Cl.⁵ .......................... H02J 7/00; H01M 10/46
[52] U.S. Cl. ............................................. 320/2; 320/15; 429/98
[58] Field of Search ...................... 320/2, 6, 7, 15, 16, 320/48; 307/149, 150; 429/96, 97, 98, 99, 100

[56] References Cited

U.S. PATENT DOCUMENTS

| | | | |
|---|---|---|---|
| 2,176,671 | 10/1939 | Huth | 310/50 |
| 3,579,075 | 5/1971 | Floyd | 320/2 |
| 3,665,285 | 5/1972 | Mullersman et al. | 320/2 |
| 3,694,729 | 9/1972 | Jones | 307/150 |
| 3,696,283 | 10/1972 | Ackley, III | 320/2 |
| 4,138,531 | 2/1979 | Thompson | 429/98 |
| 4,303,876 | 12/1981 | Kelly, III et al. | 320/2 |
| 4,319,178 | 3/1982 | Sugalski | 320/2 |
| 4,611,160 | 9/1986 | Camens | 320/2 |
| 4,622,507 | 11/1986 | Persen | 320/2 |
| 4,629,962 | 12/1986 | Arakawa | 429/98 X |
| 4,636,703 | 1/1987 | Tohya et al. | 320/2 |
| 4,691,157 | 9/1987 | McDermott | 320/2 |
| 4,739,242 | 4/1988 | McCarty et al. | 320/15 X |
| 5,039,929 | 8/1991 | Veistroffer et al. | 320/2 |

Primary Examiner—Steven L. Stephan
Assistant Examiner—Kristine Peckman
Attorney, Agent, or Firm—Finnegan, Henderson, Farabow, Garrett & Dunner

[57] ABSTRACT

A battery/battery charger housing having multiple exterior surfaces. The housing includes an interior area sized to hold a battery pack, that interior area provided with connectors for electrically connecting the housing and the battery pack. The housing also includes a second interior area sized to hold the battery charger, that area provided with connections for electrically connecting the housing and the battery charger, and connectors for electrically connecting to an electrical power source and for electrically connecting to the battery charger with the battery pack. Additionally, electrical junctions on at least two of the exterior surfaces of the housing allow for the housing to be electrically connected to another battery/battery charger housing.

24 Claims, 9 Drawing Sheets

VERSATILE BATTERY/CHARGER MODULE AND SYSTEM

BACKGROUND OF THE INVENTION

1. Field of Invention

The present invention relates to the battery/battery charger module including a battery, a battery charger and a junction portion, and more specifically relates to such a module which is adapted for connecting to other battery/battery charger modules for creating a modular system.

2. Discussion of the Related Art

Various battery charger systems are known in the art. For example, U.S. Pat. No. 3,696,283 shows a charger unit which can be detachably mated to charging modules capable of accommodating a varying number of batteries to be charged. U.S. Pat. No. 3,694,729 shows a portable electric power apparatus for a truck. The apparatus contains two battery packs, each having four six volt battery units, which are connected to a truck's electrical system. U.S. Pat. No. 4,691,157 shows a battery charger apparatus for an automobile. The apparatus rack is connected to the electrical system of an internal combustion engine and to a module which houses the battery to be charged. U.S. Pat. No. 4,636,703 shows a charging apparatus having a U-shaped cell frame and a power supply casing.

Many of the above battery charger systems have limited application, and all are limited in their flexibility. It is thus desirable to have a battery/battery charger system which offers greater flexibility in configuration system and has an open architecture which allows a battery and battery charger system to be created by connection of multiple battery/battery charger modules.

SUMMARY OF THE INVENTION

An object of the invention is to create a battery/battery charger module and system of simple design and low cost allowing for an open architecture which achieves a flexible system.

Additional objects and advantages of the invention will be set forth in part in the description which follows, and in part will be obvious from the description, or may be learned by practice of the invention. The objects and advantages of the invention will be realized and attained by means of the elements and combinations particularly pointed out in the appended claims.

To achieve the objects and in accordance with the purpose of the invention, as embodied and broadly described herein, the invention comprises a battery/battery charger module, the module for holding a battery pack and a battery charger and connecting with a power source, the module comprising a housing having multiple exterior surfaces; first electrical connections associated with the housing for connecting with the battery pack; second electrical connections associated with the housing for connecting with an input of the battery charger; third electrical connections associated with the housing for connecting with an output of the battery charger; additional electrical connections for connecting the electrical power source to the second electrical connections and for electrically connecting the third electrical connections with the first electrical connections; and electrical junctions on at least two of the exterior surfaces, the junctions being connected with the power source and allowing the module to be electrically connected to a like module.

Preferably, the housing has electrical junctions on four sides. Further preferably, those junctions include either banana plugs or keyhole connectors on each side. It is also preferred that the area which holds the battery pack have a sloped floor which uses gravity to enhance the electrical and mechanical connections between the housing and the pack.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate one embodiment of the invention and together with the description, serve to explain the principles of the invention.

DESCRIPTION OF THE PREFERRED EMBODIMENT

Reference will now be made in detail to the presently preferred embodiments of the invention, examples of which are illustrated in the accompanying drawings. Wherever possible, the same reference numbers will be used throughout the drawings to refer to the same or like parts.

Figure 1:
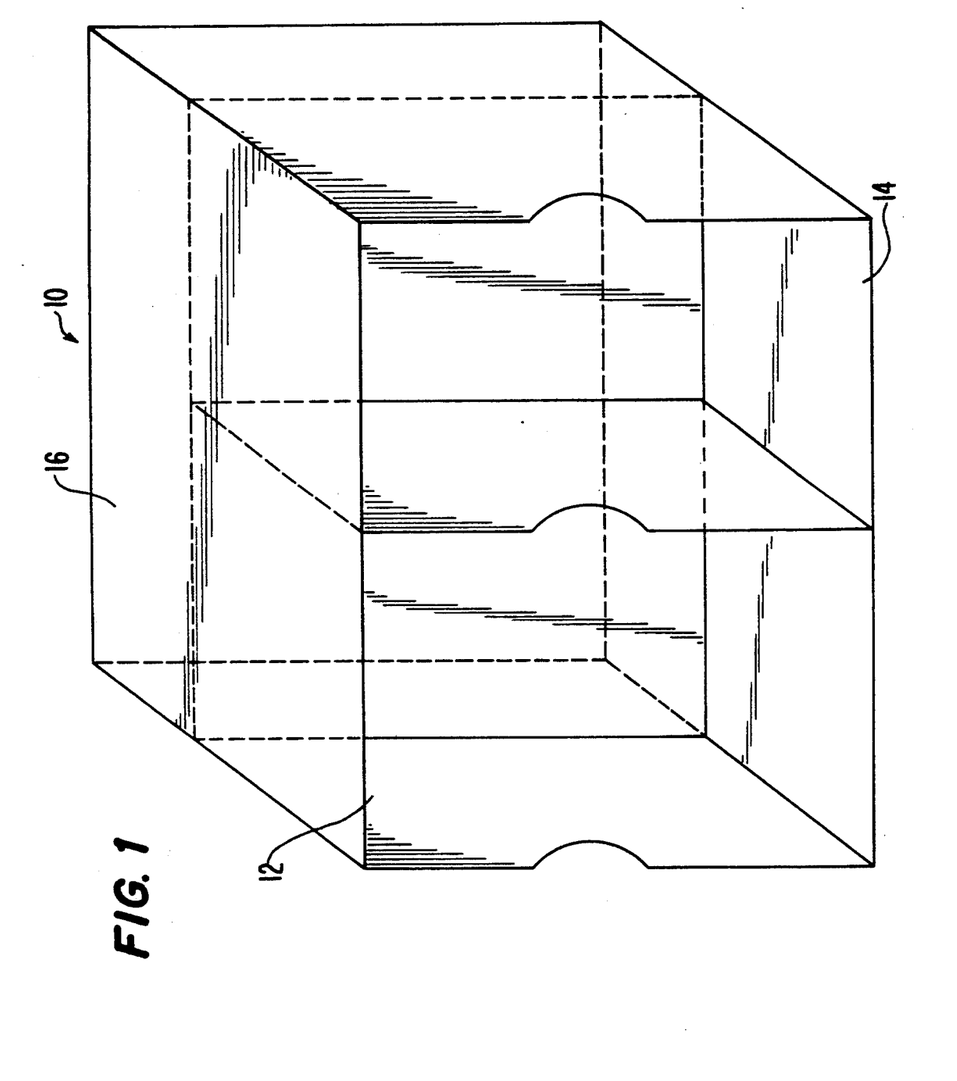
FIG. 1 is a perspective view of the housing for a battery charger module according to the invention.

A battery/battery charger module according to the invention, comprises a housing 10, as shown in FIG. 1. The housing is preferably made of a hard, long-life rugged plastic, but may be made from metal. In the preferred embodiment the housing has a plurality of walls and dividers that form three major compartments: the battery charger compartment 12, the battery pack compartment 14, and the junction or wiring compartment 16. In the primary embodiment of the invention, AC power is supplied to the battery/battery charger module by using a power input plug which is electrically connected to a second AC wall outlet.

The housing should be as light and small as possible. Typical dimensions are 14 cm wide, 9 cm high and 14 cm long, with a weight of 10 to 16 oz. It is preferred that housing 10 have openings in the back wall and in the internal walls to facilitate air circulation and to allow heat to be transferred out of the housing. In the preferred embodiment, a standard 6-foot AC cord capable of transferring 15 Amps of 120 V power is used. Preferably, a circuit breaker (not shown) is placed in the input power line to prevent current surge or overdraw.

Figure 2:
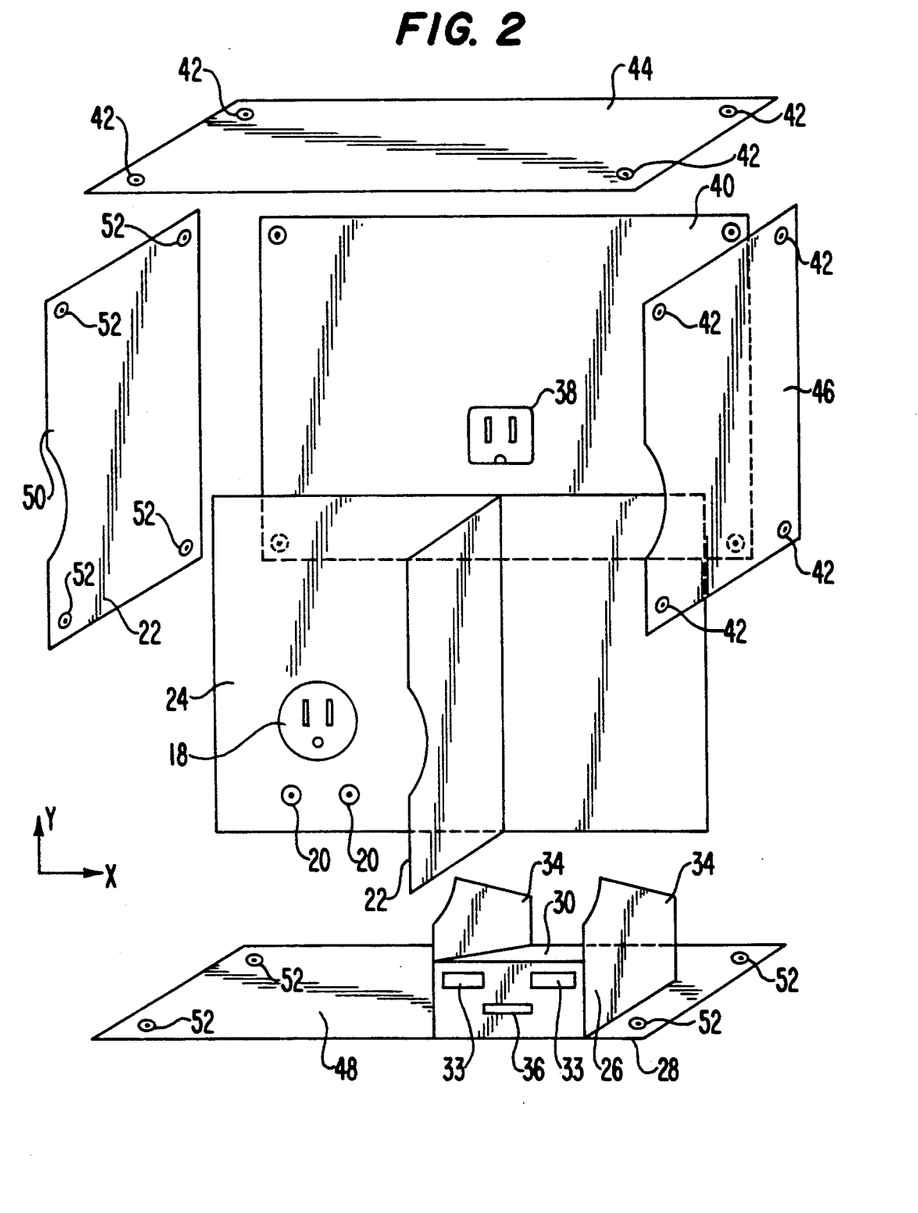
FIG. 2 is an exploded perspective view of the housing.

As shown in FIG. 2, the compartment for the battery charger includes a female power plug 18, female banana plugs 20 and guiding walls 22. The female power plug 18 allows input of power to a battery charger (discussed later) via a male plug in the charger. Plug 18 is preferably centered along the X axis and positioned along the upper portion of the Y axis on the back wall 24 of the compartment and faces the open front side of the housing. (The X and Y axis are depicted in FIG. 2.)

Female banana plugs 20 are for transmitting DC output power from a male banana plug of the battery charger module through housing 10 to a battery pack (discussed later) for charging. Female banana plugs 20 are preferably centered along the X axis and positioned along the lower portion of the Y axis on back wall 24 of compartment 12 facing the open front side of the housing.

Guiding walls 22 of compartment 12 serve to guide the battery charger for proper alignment of the male power input plug and the male DC power output banana plugs of the charger with female plug 18 and female DC banana plugs 20 of battery charger compartment 12. Walls 22 are preferably parallel to the housing side walls and are sufficiently high to engage and guide a selected battery charger. The walls 22 have a height and depth sufficient to accept the battery charger that will be used in the designed battery/battery charger module. One of the guiding walls may be the outer side wall of the compartment. The distance between the two walls is preferably equal to the width of the battery charger to be inserted between the walls, plus an appropriate clearance, e.g., 0.5 inch.

The battery pack compartment 14 may be located in the right half of housing 10. In the preferred embodiment, compartment 14 houses a battery pack holder terminal 26 which is custom built to hold various battery packs (discussed later). The compartment 14 can also be designed to hold batteries. For ease of installation and modification, the terminal is secured by screws to the bottom 28 of housing 10. Battery pack holder terminal 26 consists of four sections: base 30, contacts 33, guiding walls 34, and fuse 36.

Base 30 is the flat surface of battery holder terminal 26 where the battery pack will be placed. It preferably has a minimum of a 20-30 degree slope toward the inside of compartment 14. The slope allows the use of a longer battery pack because the length of the base is longer when it is sloped. Also, the slope allows gravity to bias the battery pack toward the rear of the terminal 26. This design aids in making good connections between the battery pack and the housing.

The exact position, placement and shape of battery holder terminal contacts 33 may vary depending on the shape and location of the battery or battery pack to be inserted into the terminal. However, regardless of the position of contacts 33, it is preferable that the base of the terminal be inwardly sloped so that the weight of the battery pack to be used increases the force maintaining the mechanical or electrical connections between the battery pack and the housing. Furthermore, contacts 33 are preferably plated with a non-rusting, non-staining metal.

Guide walls 34 guide the battery pack for ease of alignment between its power contacts and the DC power contacts of the battery pack compartment. Walls 34 are preferably positioned parallel to the side walls of housing 10 and have a height that is sufficient to engage and guide the battery pack as it is being inserted into the battery terminal. In a preferred embodiment, the height is equal to the distance from the base to the bottom of the housing plus one inch. This height ratio should be maintained throughout the length of the wall with regard to the 20-30 degree slope. The distance between walls 34 is preferably slightly greater than the width of the battery pack, e.g., plus one quarter of an inch, and walls 34 are preferably centered within compartment 14.

Figure 4:
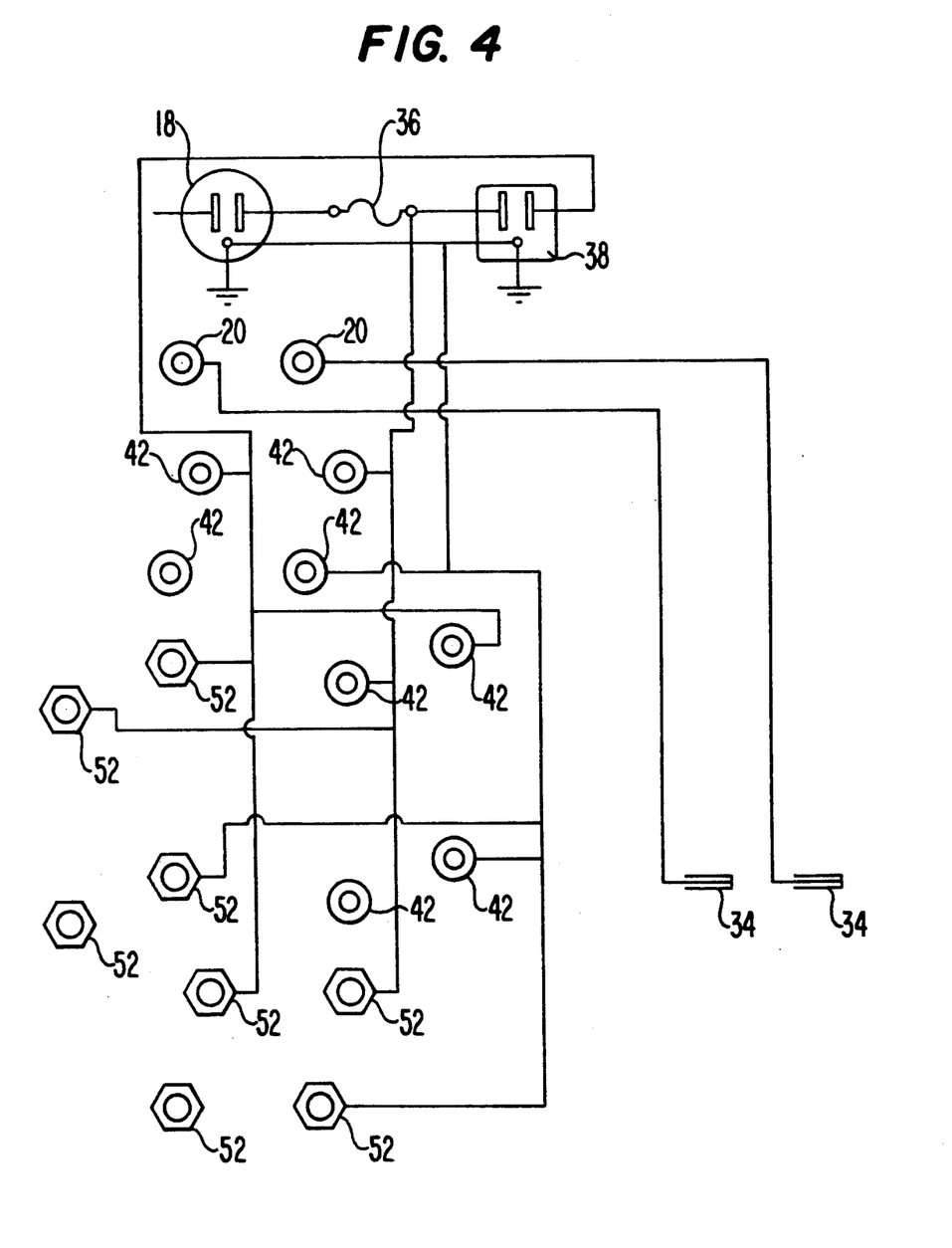
FIG. 4 is a schematic depiction of the electrical circuitry of the housing.

The unit includes a safety device (in the form of a fuse or circuit breaker) to protect the electronic components from current spikes. Fuse 36 is preferably physically located beneath base 30 facing the front of the housing on a small wall between the bottom 28 of the housing and base 30 of compartment 14 created by the 20-30 degree angle slope. It is preferred that fuse 36 be centered in this wall and placed at a very visible and accessible location. As shown in FIG. 4, the fuse should be positioned immediately between the male AC input plug 38 and the female AC input plug 18 inside battery charger module compartment 12. Preferably, the fuse protects the charger from surges over 3 Amps. As will be explained in more detail below, this fuse protects the battery/battery charger, the battery terminal, and any other battery/charger modules (and associated charger and terminals) connected to this battery/battery charger module.

In the embodiment disclosed, a junction compartment 16 is located on the back side of housing 10 behind battery charger compartment 12 and battery pack compartment 16. Compartment 16 houses various plugs, connectors and wires which make the connections between the three compartments. Compartment 16 has four elements: male power entry plug 38, female plug 18, female banana plugs 20, and electrical wiring associated with the battery/battery charger module. As will be obvious to persons skilled in the art, the wiring could, if desired be in the form of a circuit board.

Male plug 38 is preferably located on the lower portion of the back wall 40 of compartment 16 facing the outside of housing 10. Female plug 18 (the plug described above with respect to the battery charger compartment) is physically located within compartment 16. Plug 18 is installed inside pre-cut holes in wall 24 between battery compartment 12 and junction compartment 16 in such a way that the front of plug 18 is co-planar with the inside surface of the battery charger compartment back wall 24. As described in more detail below, the plug is in electrical communications with power entry plug 38.

Female banana plugs 20 are the DC output plugs described above with respect to battery charger compartment 12. The plugs are physically located inside compartment 16. They are installed in pre-cut holes in the walls between battery charger compartment 12 and junction compartment 16 in such a way that the front of the plug is coplanar with the inside surface of battery charger compartment back wall 24. These plugs, as described in more detail below, are connected by electrical wires to the battery terminal 26.

Figure 3:
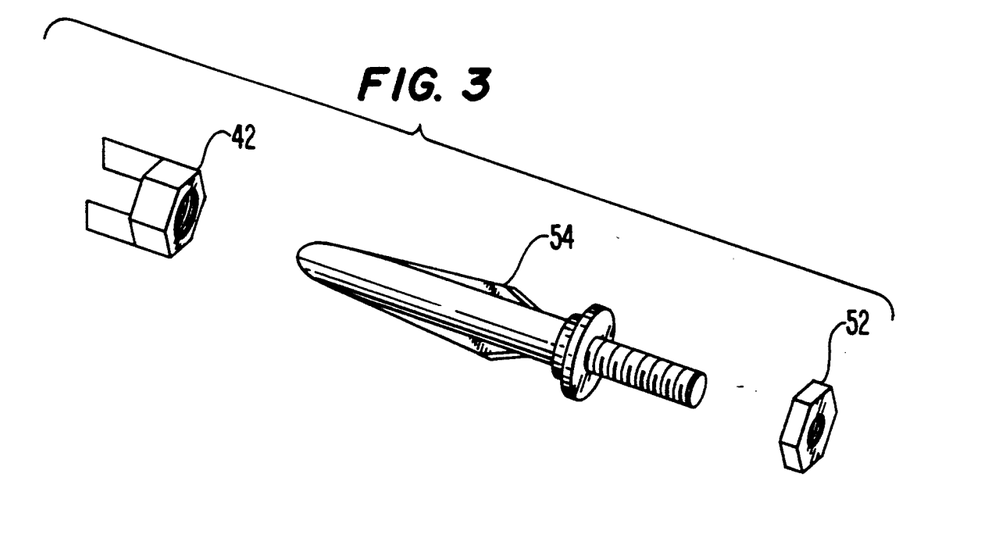
FIG. 3 is a perspective view of a banana plug as used in the invention.

In the preferred embodiment, housing 10 has a plurality of connectors on its exterior. Four female banana plugs 42 (shown in more detail in FIG. 3) are located in top surface 44, and an additional four female banana plugs 42 are located in side surface 46. Preferably bottom surface 48 and side surface 50 have four nuts 52 (shown in more detail in FIG. 3) located in the corners of each surface. Nuts 52 are capable of holding male banana plugs (shown as 54 in FIG. 3) when interconnection of two battery/battery charger modules is desired. The female banana plugs 20 and the nuts 52 are electrically connected to the power entry plug 38 and the female plug 18 providing a means to electrically connect one battery/battery charger module to another. These plugs 20 and nuts 52 also provide means for facilitating the e and electrical connection of a plurality of battery/battery charger modules. To achieve such a connection, male plugs 45 are threaded into nuts 52. Two battery/battery charger modules are then connected by pressing the male plugs 45 on one wall of a modular unit into the female plugs 20 on another modular unit. In the preferred embodiment, the female banana plugs are recessed a minimum 5 mm from the exterior surface of the outer walls. Nuts 52 are also preferably recessed at least 5 mm from the exterior surface. The recessed holes at these locations are preferably covered with removable plastic inserts to protect the plugs and nuts when they are not in use. When the male and female banana plugs are connected, the male plug should be in close contact with the female plug to achieve an excellent mechanical and electrical connection.

A schematic of the electrical connections within housing 10 is shown in FIG. 4. Power is introduced to the module through exterior plug 38. Power is applied to fuse 36 and then branches out. One branch goes to the female power plug. One branch goes to the four female banana plugs in the top surface. One branch goes to the four female banana plugs in the side surface. One branch goes to the four nuts in the bottom surface. One branch goes to the four nuts in the other side surface. The final connections connect the two DC female banana plugs in the battery charger compartment to the battery pack contacts.

Figure 5:
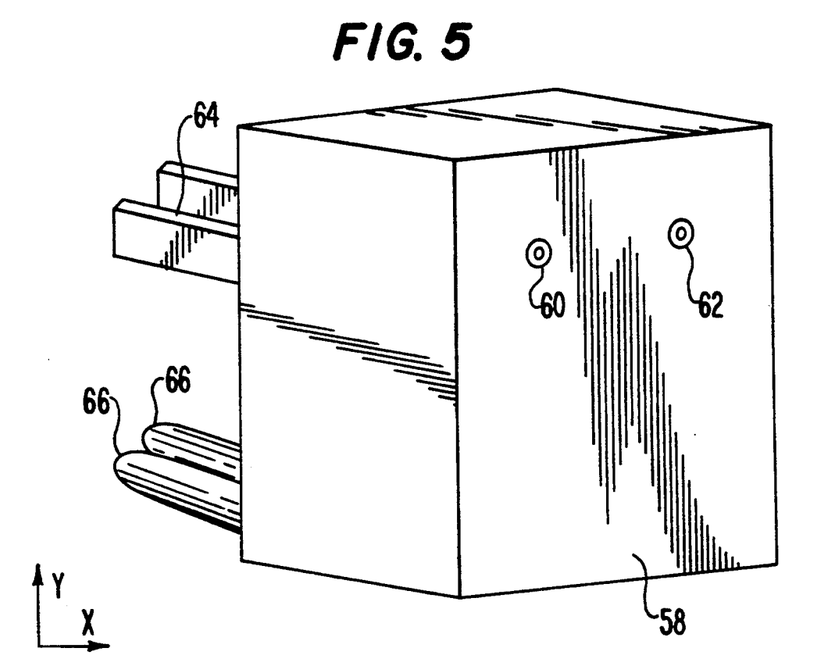
FIG. 5 is a perspective view of a battery charger as used in the invention.

When the battery/battery charger module is to be operated, a charger 58, shown in FIG. 5, is located within charger module compartment 12, and thus the dimensions of charger 58 must be smaller than those of compartment 12. Charger 58 can be a standard off-the-shelf wall mount unit or a custom-made battery charger unit. Charger 58 may be a lead acid, NiCad, or any other type of charger as long as it can charge the related battery pack. Preferably, charger 58 is a wall mount-type unit. Most commercial wall mount battery charger units consist of an internal section including circuitry and an external section having light emitting diodes 60 and 62 located on the front surface.

Light emitting diode 60 is a power LED which stays on as long as the battery charger is plugged into the AC power outlet. Its function is to indicate that the unit power is on and that it is receiving AC power from the AC outlet. Under normal operations, it should stay on for as long as the unit has power or is operational. Light emitting diode 62 is typically a charging LED which stays on as long as the battery charger is in the charging mode. Its function is to indicate that the unit is in the charging process. It will only light when the charger starts charging and will stay lit for the charging duration.

As shown in FIG. 5, an input power plug 64 is located in the external section of the battery charger unit. This input power plug 64 preferably has a two or three pin design. Its main purpose is to receive the input power from female plug 18 of battery charger compartment 12. The pins of plug 64 are typically located in the back side of battery charger 58. They are usually horizontally aligned with each other in the X axis (i.e., having the same height in the Y axis). DC output power terminals 66 are also provided on the external section of the charger unit. The DC output power terminals in a standard off-the-shelf product usually include two screws. As embodied in the present example of the invention, the two screws are replaced by two male banana plugs. The banana plugs pass the DC output power from the male banana plugs to female banana plugs 20 and into the battery pack for charging. The male banana plugs are preferably centered on the X axis and positioned on the lower portion of the Y axis on the back surface of battery charger 58.

Figure 6:
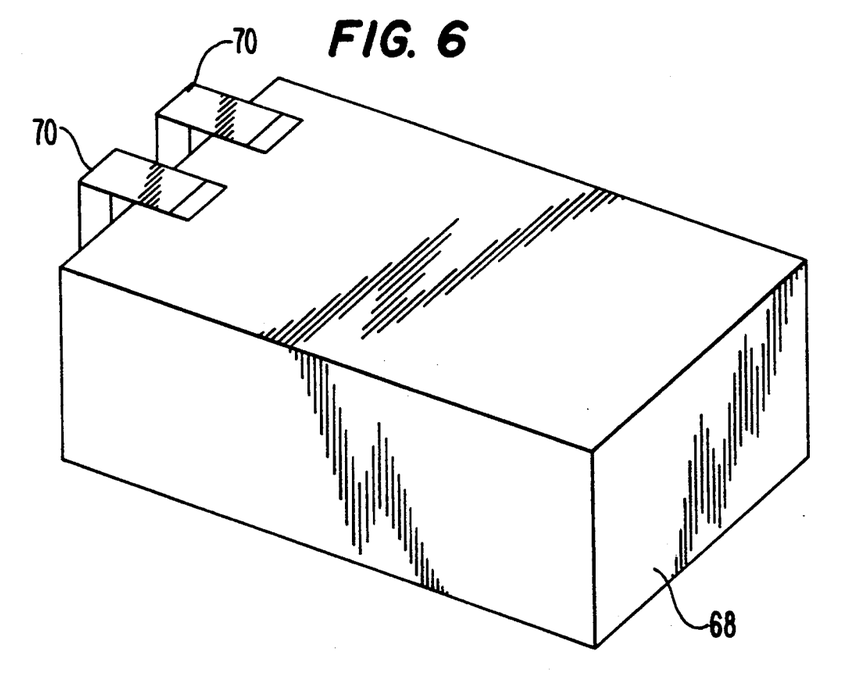
FIG. 6 is a perspective view of a battery pack as used in the invention.

Additionally, when configured for operation, a battery pack 68 is located in the battery pack compartment 14. For the purposes of the invention, a battery pack may be a single battery or a unit which holds one or more batteries. If it is a unit, battery pack 68 can hold any shape of available battery depending on the application. Such a unit is typically manufactured from hard plastic. The pack can be an off-the-shelf or a custom design with different size, cells, and capacities. The battery in the battery pack may be a lead acid, NiCad or any other type of battery so long as it is rechargeable. Most battery packs consists of a case made of rugged plastic and contacts which are positioned depending on the shape, size and type of application of the battery itself. Among the contacts are the DC input power terminals 70 which are placed on the battery pack to receive the DC power passing from the battery charger module through the casing to battery pack for charging purposes Preferably terminals 70 are plated with a non-rusting, non-staining metal.

In the preferred embodiment all electrical contacts are plated with a non-rusting, non-staining metal. Various other techniques, as known in the art, may be used to prevent corrosion of the contacts and the housing. The particular techniques used will depend on the corrosiveness of the environment for which the module is designed.

Figure 7:
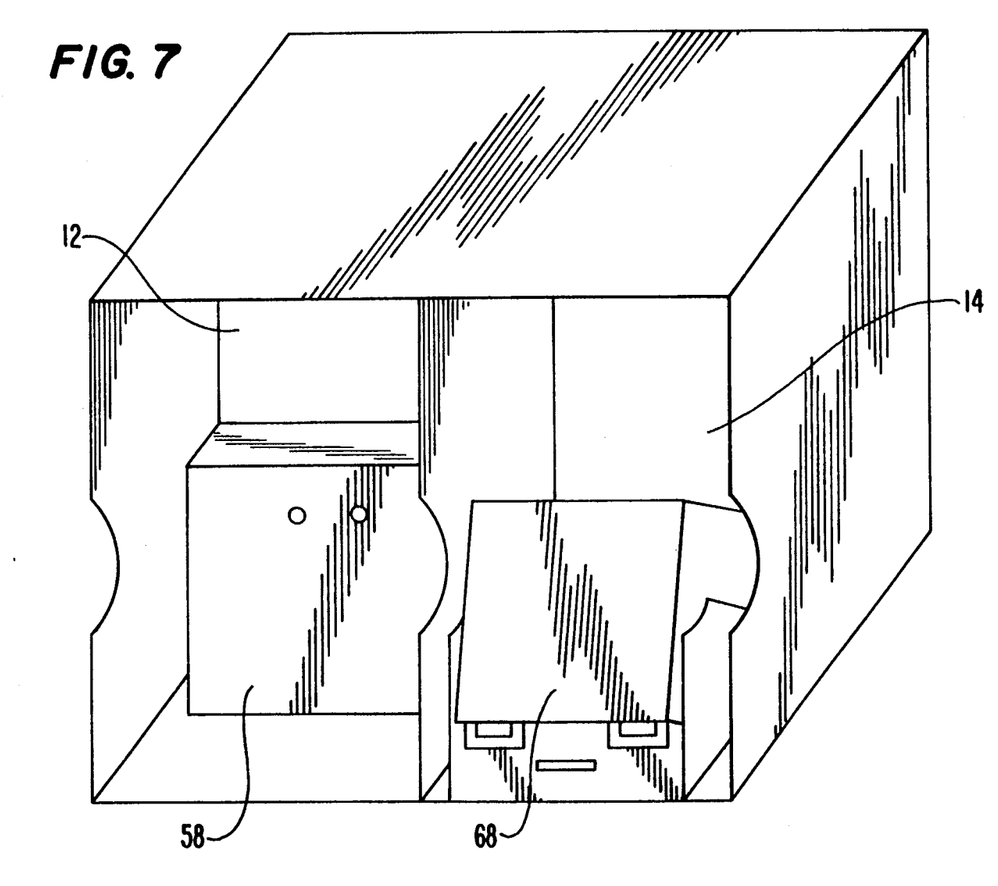
FIG. 7 is a perspective view of the housing including the battery charger and the battery pack.
Figure 8:
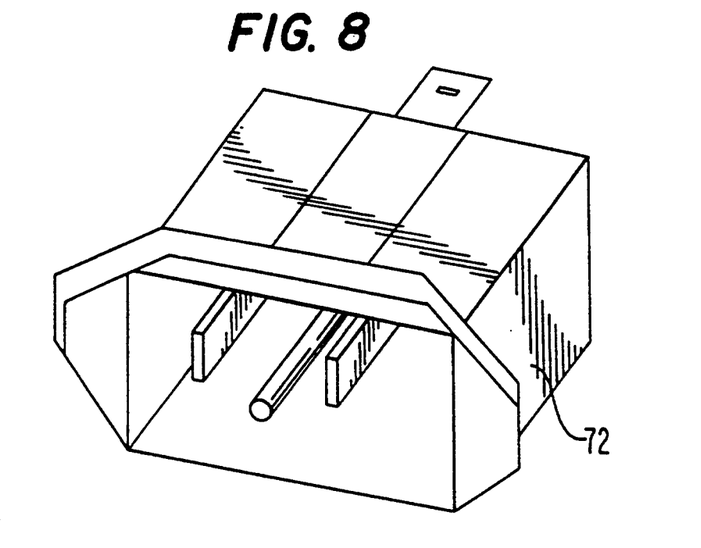
FIG. 8 is a perspective of a AC power entry plug module as used in the invention.

As a stand alone or single module, the battery/battery charger module (shown in FIG. 7) is set up as follows. Battery charger 58 is plugged into female plug 18 inside battery charger compartment 12. Battery pack 68 is plugged into battery pack compartment 14, and a female end of a power cord (not shown) is plugged into male input power entry module 72 (shown in FIG. 8) serving as input 38 (shown in FIG. 4). The male end of the power cord is then plugged into a wall power outlet (not shown).

If multiple modules are to be used, the system requires the following mechanical connections in one of two different scenarios. When the new battery/battery charger module is connected to the top of the present battery/battery charger module, the power cord of the first module is unplugged from the wall outlet. Plastic protective pins, which preferably protect and insulate the nuts, are removed from the four nuts 52 in the bottom surface 48 of the second module. A male banana plug 54 is tightened on each of the four nuts. Plastic protective pins, which preferably protect and insulate the banana plugs, are removed from all of plugs 42 on the top surface 44 of the first module. The second module is placed vertically on top of the present module so that both modules face in the same direction and each male banana plug of the top module is in line with the corresponding female banana plug on the top of the bottom module. Then the top module is slowly pushed down so that all male banana plugs are inserted into the female plugs to ensure the mechanical electrical connection between the two modules. Next, the battery chargers are plugged inside the battery charger compartments and the battery packs are plugged into the battery pack compartments. Finally, the male end of the AC power cord is plugged back into the wall outlet.

When the second module is to be connected to the right side of the present module, the power cord is again unplugged from the wall outlet. Plastic protective pins, which preferably protect and insulate the nuts, are removed from the four nuts 52 on the left side surface 50 of the second module. The bottom half of four male banana plugs 54 are screwed into each of the four nuts. Plastic protective pins, which preferably protect and insulate the banana plugs, are removed from all four plugs 42 on right side surface 46 of the present module. The right-side module is placed side by side on the right side of the first module so that they are both facing in the same direction and so that each male banana plug is in line with its female counterpart. Then the right-side module is slowly pushed toward the first module so that the banana plugs contact each other. Next, the battery charger modules are plugged inside the battery charger compartments and the battery packs are plugged into the battery pack compartments. Finally, the male end of the power cord is plugged into the wall outlet.

Figure 9:
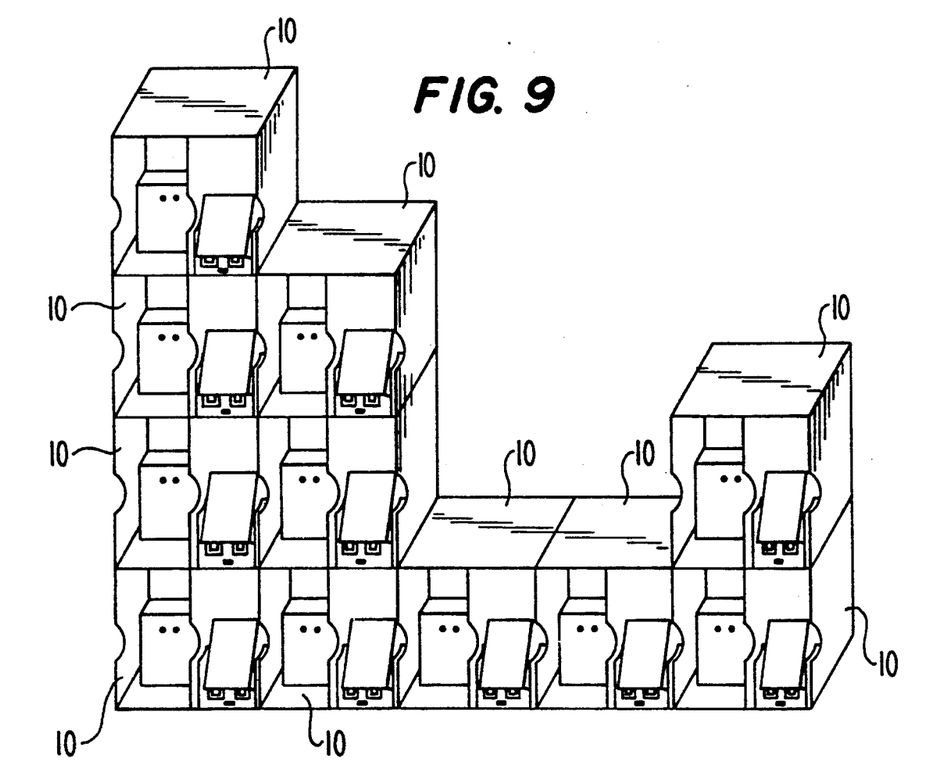
FIG. 9 is a perspective view of a system according to the invention comprising multiple battery/battery charger modules.

FIG. 9 shows an example of the variety of architecture of battery/battery charger modules that can be achieved using the present invention. Because of the 15 amp current provided by standard AC power, the invention allows the connection of 50 modules (if a 300 mA battery charger is used). Additional units may be used if the power source has a higher current or if the chargers draw less of a current.

An alternative more-preferred embodiment of the invention will be discussed with reference to FIG. 10. In this embodiment the banana plugs on the exterior of housing 10 are replaced with keyhole connectors 74. The keyhole connectors 74 are designed to hold screws in position and to act as female electrical contacts to pass power from the keyhole connectors to the screw connectors.

Figure 13:
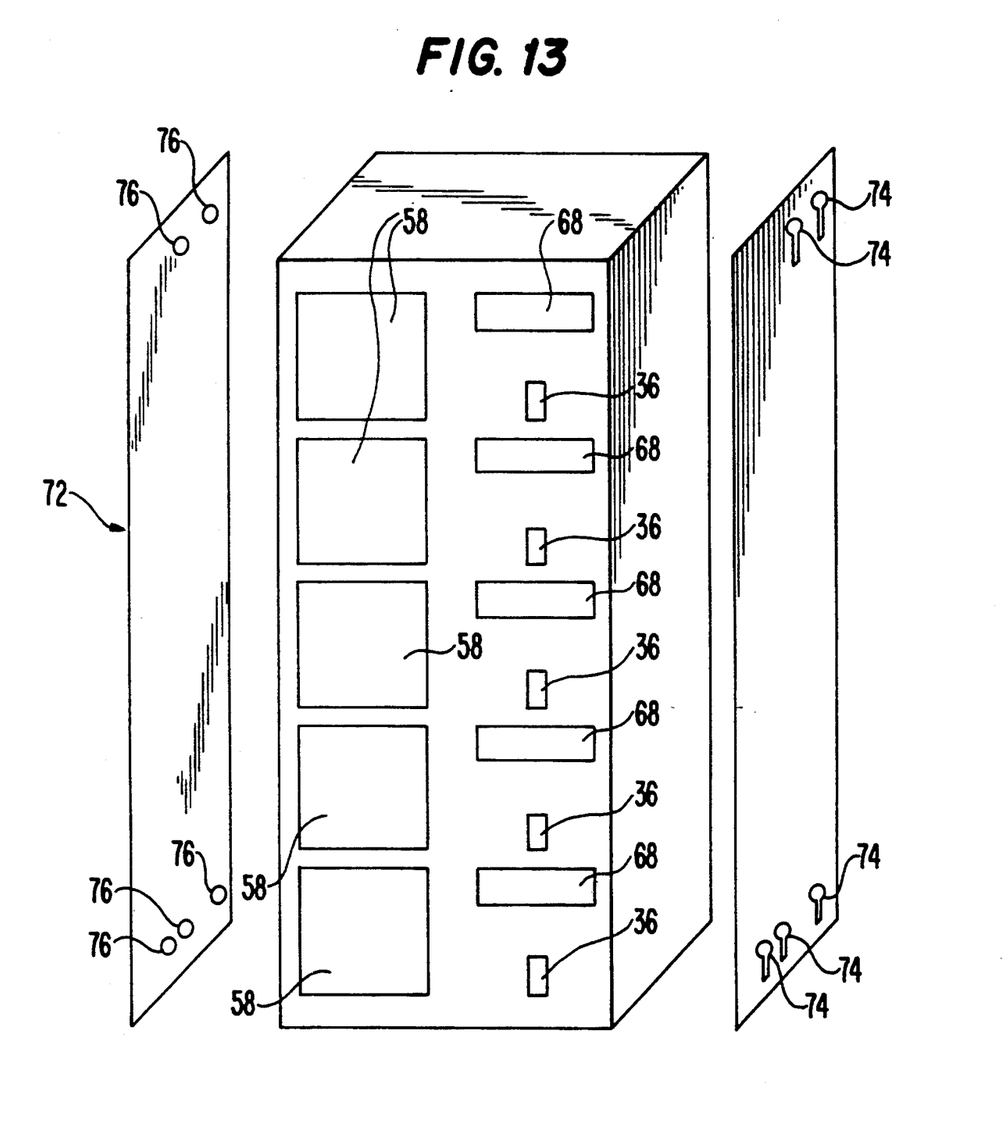
FIG. 13 depicts an embodiment of the invention including multiple charger units per charger module.

Keyhole connector 74, as used in the invention, is shown in FIG. 13. Keyhole connector 74 is a key-shaped opening formed in a wall of housing 10. Keyhole connector 74 has electrical contact 75 formed in the narrow portion of the opening. Electrical contact 75 is preferably formed on the inside of the wall of housing 10 so that it is recessed and cannot be accidentally touched. Further preferably, contacts 75 are spaced from each other a distance corresponding to the diameter of the head of screw connector 76. Furthermore, a retainer ring 77 is located on the inside of the wall with its opening facing toward the wide portion of the keyhole.

A screw connector 76 is located at a corresponding location on a wall of a mating housing. Screw connector 76 is preferably a flat head screw which is threaded into nut connector 78. Nut connector 78 is fixed to and in electrical connection with the mating housing. Screw connector 76 has a hole drilled through its diameter at the end opposite the head. Once the screw connector is threaded into nut connector 78, a hitch pin 79 is placed in the hole to prevent the screw from being completely unthreaded.

Screw connector 76 and keyhole connector 74 are connected by extending the head of the screw connector from the nut connector, placing the head of the screw connector in the wide portion of the keyhole connector, and then sliding the screw connector to the narrow portion of the keyhole connector. The screw connector "locks" in ring retainer 77 providing added mechanical connection. The screw connector can only be slid back to the wide portion of the keyhole with significant and intentional force.

The keyhole connectors result in an improved mechanical connection when compared with banana plugs. Additionally, the keyhole connectors offer a safety improvement since no portion of the screw connector is exposed when an electrical connection is made. On the other hand, with a banana plug, a portion of an electrically connected male plug is exposed as the modules are slid together.

The contacts in the keyhole connectors are preferably recessed for safety, and further preferably recessed in accordance with U.L. standards. A plastic flathead screw (not shown) preferably covers each keyhole when not in use. In this embodiment, there are, for example, ten keyhole connectors per housing: three on the right side wall, three on top, two on the left side wall and two on the bottom.

The keyhole connectors on the top and the bottom are preferably oriented from right to left, with the narrow portion toward the left. The keyhole connectors on the right and left side walls are oriented vertically, with the narrow position to the bottom.

Electrical contacts 75 are formed in the narrow portion of the keyhole connectors. The keyholes connectors should be placed so that the sides of housing 10 and the sides of a mating housing are aligned when the screw connector is slid to the far end of the narrow portion of the key connector. Preferably, the number of screw and keyhole connectors is the same.

Screw connectors 76 are aligned to hold two housing securely together and act as electrical contacts. Screws are preferably made of the same metal as the nut contacts (discussed later) and the electrical contacts of the keyhole connectors. A hole is drilled through the diameter at the end of the screw after the screw is inserted in its corresponding nut contact a hitch pin clamp is placed in the hole. In this manner the screw is prevented from being completely unscrewed from the nut and the extent to which a fully unscrewed screw extends from the nut can be controlled precisely. All of the screw connectors should have identical dimensions to ensure uniform mechanical and electrical connectivity. The extended length of the screws should be equal to the distance between the keyhole connector and related nut contact so that there is no movement between two housings mated together.

When the screw connectors are not in use, they are screwed to be flush with the housing. On the other hand, when two modules are to be connected, the screw connectors are fully extended from the housing, their length having been previously selected to extend the precise distance from the housing wall to the inside of the mating keyhole connector.

The nut contacts 78, mentioned above, and shown in greater detail in FIG. 13, are physically attached to the wall of the housing. Nut contacts 78 hold screw connectors 76 in position and acts as an electrical contact between the nut and the screw. The nut should be recessed a distance from the outer housing wall equal to the thickness of the head of the screw, so that the head is flush when retracted. Preferably, there are 10 nut contacts per housing: three on the left side wall, two on the right side wall, two on the top and three on the bottom.

Figure 10:
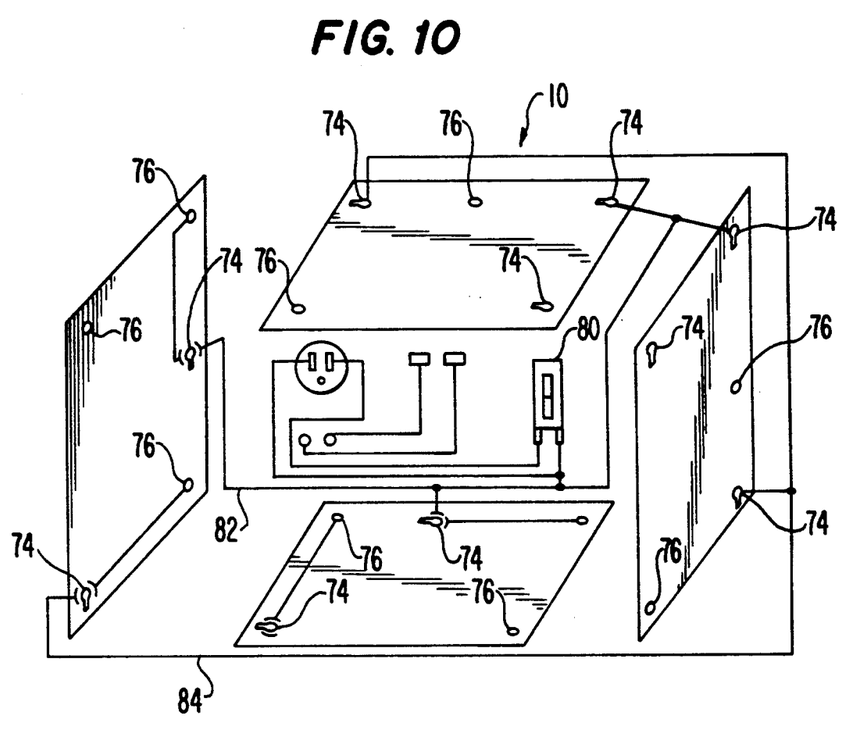
FIG. 10 depicts an alternate embodiment of the invention using keyhole connectors.
Figure 11:
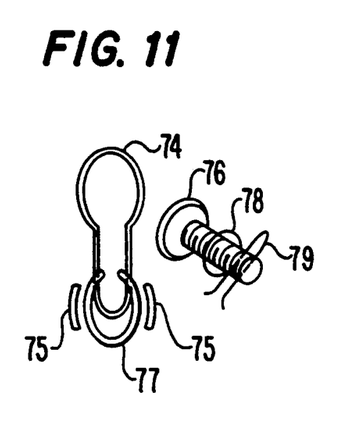
FIG. 11 is a detailed depiction of a keyhole connector.
Figure 12:
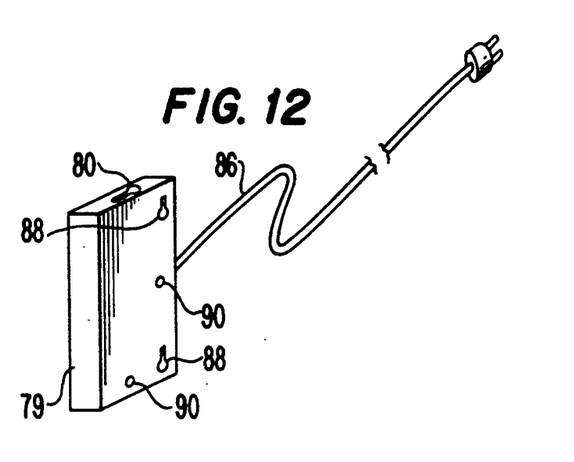
FIG. 12 depicts an AC power cord as used in the embodiment of FIG. 10.

In embodiment shown in FIG. 10, one electrical circuit 82 connects circuit breaker 80 to some of the nut and keyhole connectors and a second circuit 84 connects other nut and keyhole connectors, but does not connect with circuit breaker 80. This circuitry is designed to increase safety. Preferably, a circuitry design is chosen in accord with U.L. Standards. In this embodiment AC input power is provided by an AC adaptor 79 having circuit breaker 80, cord 86, keyhole connectors 88 provided with power and screw connectors 90. Preferably, the height of AC adaptor 79 does not exceed the height of housing 10. The bottom of the AC adaptor should be flush with the bottom of housing 10 when installed.

A battery charger module according to the embodiment in FIG. 10 may be used as a stand-alone unit or as a system. If the module is to be used as a single unit, the screws 90 on AC adaptor 79 should be extended and screws related to keyhole connectors 88 should also be extended from the housing. In order to install the AC adaptor 79, the keyholes must be in line with the related screws. Adaptor 79 is then pushed into and downward against housing 10 until its bottom surface is at the same level as the bottom surface of the housing. Then power cord 86 may be plugged into a wall outlet.

If the embodiment shown in FIG. 10 is to be used in combination with another module, all of the screws on the selected sides of those modules must be fully extended. The modules are then placed side-by-side so that the keyhole and screw connectors are aligned. Then the screw connectors are pushed so that they rest in the narrow section of the keyhole connectors. At this point, the modules can now be connected to a power source.

A further embodiment of the invention is discussed with reference to FIG. 13. Instead of an individual housing 10, a rack 92 may be used for housing multiple chargers and battery packs. FIG. 13 depicts a housing capable of holding five battery packs and chargers. In this embodiment, each battery pack and respective charger are electrically connected in the same way that they are for the individual modules, described above. The only difference is that the chargers and battery packs are located in one elongated housing. Housing 92 has keyhole connectors 74 and screw connectors 76 only on the right and left side of the housing, because the length of the extended housing makes it inconvenient to connect multiple housings on top of each other. The charger racks 92 are designed to be interconnected with each other in the same manner as discussed for the side-to-side connection of the individual housings.

Various further embodiments of the invention can readily be envisioned. For example, the battery/battery charger module may use a DC power input source. The DC power is then transmitted to the battery charger and eventually to the battery. In this embodiment, male and female banana pins or key hole connectors on the exterior surfaces will be used to transmit DC rather than AC power to other like battery/battery charger modules. Likewise, the AC adaptor may be attached to any of the multiple housings depending on which is more convenient.

One specific further embodiment includes a system according to the invention having only a single battery/battery charger module capable of connecting to an input power source. The remaining modules in this system would receive power only through connection to each other.

A battery/charger module according to the invention offers the benefits of design simplicity, low cost, ease of operation, ease of troubleshooting, low cost of troubleshooting, ease of repair, low repair cost, flexibility, adaptability, versatility, a totally modular design, use of standard off-the-shelf modules, and the use of easy-to-find and common parts. The total system is transferable to a plurality of stand alone units and a plurality of stand alone units may become one system. This system is flexibly reconfigurable and has a capability of replacing or removing any part from each system. The system also has the benefits of being connectively flexible, adaptable to various types of charging, adaptable to various types and/or sizes of battery cells, easily modifiable, easily connected, easily configured into different systems, and easily installed. Unlike other systems usually consisting of 4 or 5 more charging units built in one frame, there is no need to pay for multiple units when there is only a need for an additional one unit capacity. The system is capable of working with either AC or DC power. The system has a capability of having various sizes and types of battery cells/packs within the same system. Each battery/battery charger module operates independently from other modules within the system, and the capability to upgrade or change the charging method of the system is available by modifying only the battery/battery charger module without affecting the entire system. Thus, major changes can be made to the system by simply replacing the battery terminal. Furthermore, flexibility is provided by allowing each battery/battery charger module to be mounted on any of four sides (top, bottom, left side and right side).

It will be apparent to those skilled in the art the various modifications and variations can be made in the design of the present invention and in the construction of this battery/battery charger module without departing from the scope or spirit of the invention.

Other embodiments of the invention will be apparent to those skilled in the art from consideration of the specification and practice of the invention disclosed herein. It is intended that the specification be considered as exemplary only, with the true scope and spirit of the invention being indicated by the following claims.

What is claimed is:

1. A battery/battery charger module for holding a battery pack and a battery charger and for connecting with a power source, the module comprising:
   a housing having multiple exterior surfaces;
   first electrical connections located in the housing and positioned for connection with the battery pack;
   second electrical connections located in the housing and positioned for connection with an input of the battery charger;

third electrical connections located in the housing and positioned for connection with an output of the battery charger;

additional electrical connections for connecting the electrical power source to the second electrical connections and connecting the third electrical connections with the first electrical connections; and electrical junctions on respective ones of at least two of the exterior surfaces, the junctions connected to the power source and allowing the module to be electrically connected to another battery/battery charger module, said junctions selected from the type of junctions which are retractable and removable.

2. A battery/battery charger module for holding a battery pack and a battery charger and for connecting with a power source, the module comprising:

a housing having multiple exterior surfaces;

first electrical connections located in the housing and positioned for connection with the battery pack;

means for using the weight of the battery pack to aid in securing the first electrical connections;

second electrical connections located in the housing and positioned for connection with an input of the battery charger;

third electrical connections located in the housing and positioned for connection with an output of the battery charger;

additional electrical connections for connecting the electrical power source to the second electrical connections and connecting the third electrical connections with the first electrical connections;

electrical junctions on at respective ones of least two of the exterior surfaces, the junctions connected to the power source and allowing the module to be electrically connected to another battery/battery charger module.

3. The module as claimed in claim 2, wherein the weight using means comprises a sloped base upon which the battery pack rests.

4. The battery/battery charger module for holding a battery pack and a battery charger and for connecting with a power source, the module comprising:

a housing having multiple exterior surfaces;

first electrical connections located in the housing and positioned for connection with the battery pack;

second electrical connections located in the housing and positioned for connection with an input of the battery charger;

third electrical connections located in the housing and positioned for connection with an output of the battery charger;

additional electrical connections for connecting the electrical power source to the second electrical connections and connecting the third electrical connections to the first electrical connections; and electrical junctions on respective ones of at least two of the exterior surfaces, wherein each of said electrical junctions include at least three electrical connectors per exterior surface having one of said electrical junctions, the junctions being connected to the power source and allowing the module to be connected to another battery/battery charger module.

5. The module as claimed in claim 4, wherein each exterior surface having one of said electrical junctions has four connectors.

6. The housing as claimed in claim 5, wherein the four connectors include four female banana plugs.

7. The housing as claimed in claim 5, wherein the four connectors include four nuts capable of holding male banana plugs.

8. The module as claimed in claim 4, wherein the electrical junctions include a keyhole connector.

9. A battery/battery charger module, comprising in one unit:

a battery;

a battery charger; and a junction portion including an AC input plug connectable to an AC power source and multiple mating connectors each capable of mating with another battery/battery charger module, said mating connectors selected from a removable type and a retractable type.

10. A battery/battery charger module, comprising in one unit;

a battery;

a battery charger; and a junction portion including an AC plug connectable to an AC power source and multiple mating connectors each capable of mating with another battery/battery charger module, wherein the module has multiple mating surfaces which include said mating connectors and each of said mating surfaces includes at least three plugs.

11. A battery/battery charger module, comprising:

a housing;

a battery contained within a first portion of the housing;

a battery charger contained within a second portion of the housing; and a junction portion of the housing containing at least three mating connectors, each connector configured for mating to a respective other battery/battery charger module.

12. A battery/battery charger module, comprising:

a housing;

a battery contained within a first portion of the housing;

a battery charger contained within a second portion of the housing; and a junction portion of the housing containing multiple mating connectors each configured for mating to a respective other battery/battery charger module, wherein each of said mating connectors includes at least three plugs for establishing an electrical circuit between the battery/battery charger module and the respective other battery/battery charger module.

13. The module as claimed in claim 12 wherein the plugs include keyhole connectors.

14. A modular unit for holding a battery charger to be powered by a main power source and a battery pack to be charged, the unit comprising:

a housing having a plurality of exterior walls forming an accessible compartment for receiving the battery charger and the battery pack;

electrical circuitry connectable to the power source and incorporated in said housing for establishing connection among the power source, the battery pack, and the battery charger; and electrical junctions on respective ones of at least three of said exterior walls, each junction being electrically connected to said power source and configured to allow the housing to be electrically connected to a respective other modulator unit.

15. A modular unit for holding a battery charger to be powered by a main power source and a battery pack to be charged, the unit comprising:
   a housing having a plurality of exterior walls forming an accessible compartment for receiving the battery charger and the battery pack;
   electrical circuitry connectable to the power source and incorporated in the housing for establishing electrical connections among the power source, the battery pack and the battery charger;
   electrical junctions on respective ones of at least two of said exterior walls, each junctions being electrically connected to said power source and configured to allow the housing to be electrically connected to a respective other modular unit; and
   a plurality of connection means formed on each of said respective at least two exterior walls of said housing for facilitating the connection of one housing to a complementary housing, wherein said electrical junctions are incorporated as part of at least some of said connection means.

16. The modular unit of claim 15 wherein said connection means on one exterior wall include electrically conducting female plugs and said connection means on the other wall include electrically conducting means capable of holding an electrically conducting male member for insertion into said female plugs.

17. A modular unit for holding a battery charger to be powered by a main power source and a battery pack to be charged, the unit comprising:
   a housing having at least four opposing exterior walls forming an accessible compartment for receiving the battery charger and the battery pack;
   electrical circuitry connectable to the power source and incorporated in said housing for establishing connection among the power source, the batter pack and the battery charger; and
   electrical junctions on respective ones of at least two of said exterior walls, each junction being electrically connected to said power source and configured to allow the housing to be electrically connected to a respective other modular unit,
   wherein electrically conducting female plugs are formed on one of two opposing exterior walls to provide electrical functions and connection means on that set of opposing walls, the opposing exterior walls comprising one of said exterior walls of the housing and an exterior wall of said respective other modular unit, and wherein electrically conducting attachment means, capable of holding an electrically conducting male member for insertion into said female plugs, are formed on other of the opposing exterior walls to provide electrical junctions and connection means on the other of the opposing walls.

18. The modular unit of claim 17 wherein said female plugs and said attachment means are received below the exterior surface of said exterior walls.

19. The modular unit of claim 17 further comprising removable plugs for covering said female plugs and said attachment means when they are not in use.

20. The modular unit as claimed in claim 17 further comprising removable plugs for covering said female plugs and means for retracting the male plugs when not in use.

21. The modular unit of claim 14 further comprising a safety fuse connected between said inlet plug and both of said electrical circuitry and said electrical junctions, whereby the battery charger and the battery are protected from power surges.

22. A modular unit for holding multiple battery chargers to be powered by a main power source and multiple battery packs to be charged, the unit comprising:
   a housing having a plurality of exterior walls forming at least two accessible compartments for receiving the battery chargers and at least two accessible compartments for receiving the battery packs;
   electrical circuitry connectable to the power source and incorporated in said housing for establishing connection among the power source, the battery packs and the battery chargers; and
   electrical junctions on respective ones of at least two of said exterior walls, each junction being electrically connectable to said power source and configured to allow the housing to be electrically connected to a respective other modular unit.

23. The modular unit of claim 16 wherein said female plug includes means for receiving said male member in a first position where there is no electrical connection between said female plug and said male member and means for allowing the received male member to move to a second position where there is an electrical connection between said female plug and said male member.

24. The modular unit of claim 23 wherein the male member is sized so that it is not exposed when in said second position.

* * * * *